United States Patent
Walker et al.

(10) Patent No.: US 10,346,435 B2
(45) Date of Patent: Jul. 9, 2019

(54) SYSTEM AND METHOD FOR IMPROVED PERFORMANCE IN A MULTIDIMENSIONAL DATABASE ENVIRONMENT

(71) Applicant: ORACLE INTERNATIONAL CORPORATION, Redwood Shores, CA (US)

(72) Inventors: Cloud Walker, Hayward, CA (US); Vinod Padinjat Menon, San Jose, CA (US); Kumar Ramaiyer, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 285 days.

(21) Appl. No.: 15/332,945

(22) Filed: Oct. 24, 2016

(65) Prior Publication Data
US 2017/0116310 A1    Apr. 27, 2017

Related U.S. Application Data

(60) Provisional application No. 62/411,473, filed on Oct. 21, 2016, provisional application No. 62/245,883, filed on Oct. 23, 2015.

(51) Int. Cl.
| | |
|---|---|
| *G06F 17/00* | (2019.01) |
| *G06F 16/28* | (2019.01) |
| *G06F 12/0873* | (2016.01) |
| *G06F 12/0868* | (2016.01) |
| *G06F 12/121* | (2016.01) |

(52) U.S. Cl.
CPC ........ *G06F 16/283* (2019.01); *G06F 12/0868* (2013.01); *G06F 12/0873* (2013.01); *G06F 12/121* (2013.01); *G06F 2212/1016* (2013.01); *G06F 2212/163* (2013.01); *G06F 2212/206* (2013.01); *G06F 2212/263* (2013.01); *G06F 2212/313* (2013.01); *G06F 2212/401* (2013.01); *G06F 2212/452* (2013.01); *G06F 2212/465* (2013.01)

(58) Field of Classification Search
CPC ......... G06F 17/30592; G06F 17/30333; G06F 17/30076; G06F 17/30306; G06F 17/30958
See application file for complete search history.

(56) References Cited

U.S. PATENT DOCUMENTS 6,629,102 B1 *  9/2003  Malloy ............. G06F 17/30595

* cited by examiner

*Primary Examiner* — Truong V Vo
(74) *Attorney, Agent, or Firm* — Tucker Ellis LLP

(57) ABSTRACT

In accordance with an embodiment, described herein is a system and method for improving performance within a multidimensional database computing environment. A multidimensional database, utilizing a block storage option, performs numerous input/output (I/O) operations when executing calculations. To separate I/O operations from calculations, a background task queue is created to identify data blocks requiring I/O. The background task queue is utilized by background writer threads to execute the I/O operations in parallel with calculations.

20 Claims, 6 Drawing Sheets

SYSTEM AND METHOD FOR IMPROVED PERFORMANCE IN A MULTIDIMENSIONAL DATABASE ENVIRONMENT

CLAIM OF PRIORITY

This application claims the benefit of priority to U.S. Provisional Application titled "SYSTEM AND METHOD FOR IMPROVED PERFORMANCE IN A MULTIDIMENSIONAL DATABASE ENVIRONMENT", Application No. 62/245,883, filed Oct. 23, 2015; and U.S. Provisional Application titled "SYSTEM AND METHOD FOR PROVIDING A MULTIDIMENSIONAL DATABASE", Application No. 62/411,473, filed Oct. 21, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to online analytical processing and multidimensional database computing environments, and to systems and methods for improving performance using background write and memory mapped I/O support.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein is a system and method for improving performance within a multidimensional database computing environment. A multidimensional database, utilizing a block storage option, performs numerous input/output operations when executing calculations. To separate I/O operations from calculations, a background task queue is created to identify data blocks requiring I/O. The background task queue is utilized by background writer threads to execute the I/O operations in parallel with calculations.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
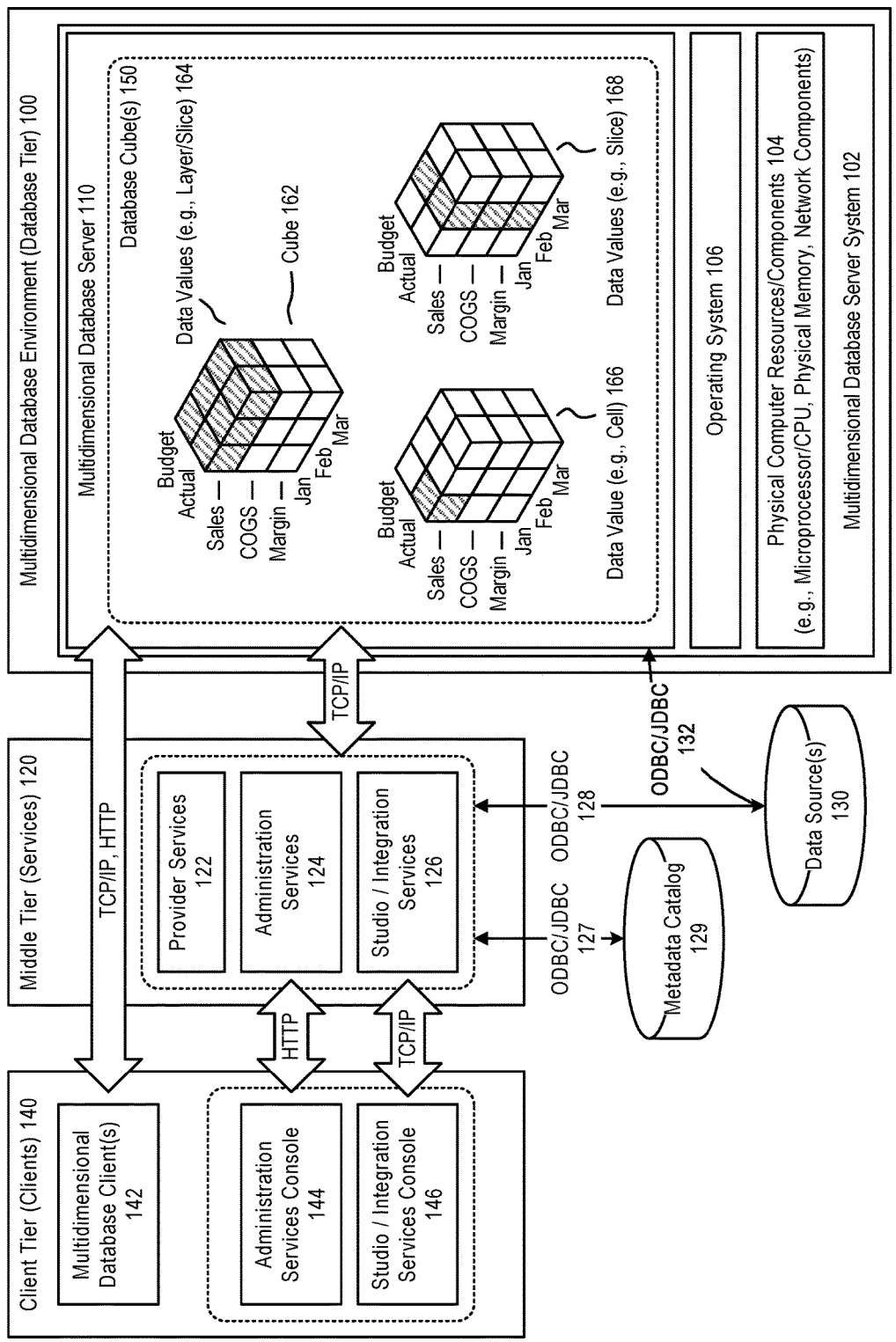
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Background Tasks

In accordance with an embodiment, described herein is a system and method for improving performance within a multidimensional database computing environment. A multidimensional database, utilizing a block storage option, performs numerous input/output operations when executing calculations. To separate I/O operations from calculations, a background task queue is created to identify data blocks requiring I/O. The background task queue is utilized by background writer threads to execute the I/O operations in parallel with calculations.

In a multidimensional database (e.g., Essbase) environment, background threads can execute particular kernel tasks that do not need to be performed by foreground worker threads. Such kernel tasks can include I/O operations, data compression, etc. Background threads can work in parallel with foreground worker threads and can operate as helper threads to carry out tasks offloaded from the worker threads. By moving these tasks to background threads, the worker threads can operate more efficiently.

One example task for background threads is writing dirty data blocks to data storage to maintain a data cache in a clean state. In accordance with an embodiment, the data cache is utilized by the worker threads during calculations to store data blocks. The number of data blocks that can be held in the data cache is often less than a total number of data blocks typically referenced by a common calculation. This disparity increases for larger data cubes.

When a data cache is full and a calculation requires another data block, an existing data block in the data cache is evicted to free space for a new block. If the data block selected for eviction is in a dirty state, the data block cannot be replaced until it is first written to disk or other data storage. This process involves first compressing the data block and executing an I/O operation to write the compressed data block to data storage. After compressing and writing, the new data block can be read into the data cache in place of the evicted block. The process of reading the new data block into the cache can involve another I/O operation to read the data block from data storage and decompressing the data block.

In accordance with an embodiment, background threads can proactively write dirty blocks present in the data cache to data storage in parallel with ongoing calculations by worker threads. Thus, the background threads facilitate maintaining the data cache in a clean state to increase a probability that worker threads select a clean block as a replacement victim when a new block is needed and the data cache is full. When the replacement victim is a clean data block, expensive compression and I/O operations are avoided. For example, a clean replacement victim does not need to be swapped out (written to disk), and can be simply overwritten in the data cache. Accordingly, the worker threads are spared from performing I/O operations and data compression, and thus can be better utilized by performing further calculations.

Due to the disparity between a total number of data blocks access during a typical calculation and a size of the data cache, data block replacement is a frequent operation. Accordingly, any improvement in this area leads to significant improvement in overall performance of calculations in a multidimensional database environment.

Background Write

In accordance with an embodiment, a background write functionality facilitates a computing environment having in-memory-computing of batch calculations and data load. Background writing facilitates reducing kernel time (i.e. compression, I/O operations) spent, and increases compute time. That is, background writing reduces the need for calculation threads to invoke the multidimensional database system kernel.

Figure 2:
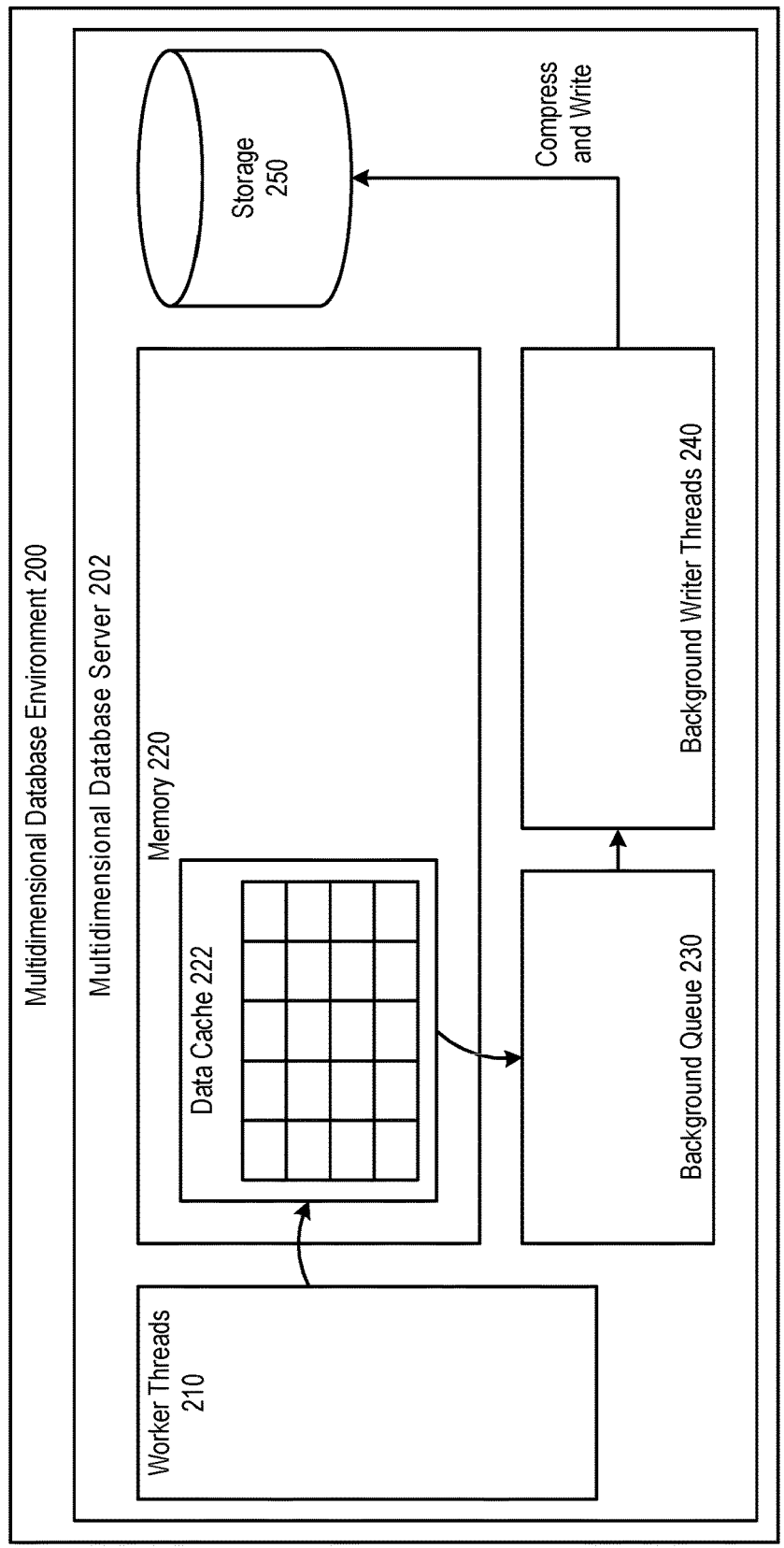
FIG. 2 illustrates a background writing process within a multidimensional database environment in accordance with an embodiment.
Figure 3:
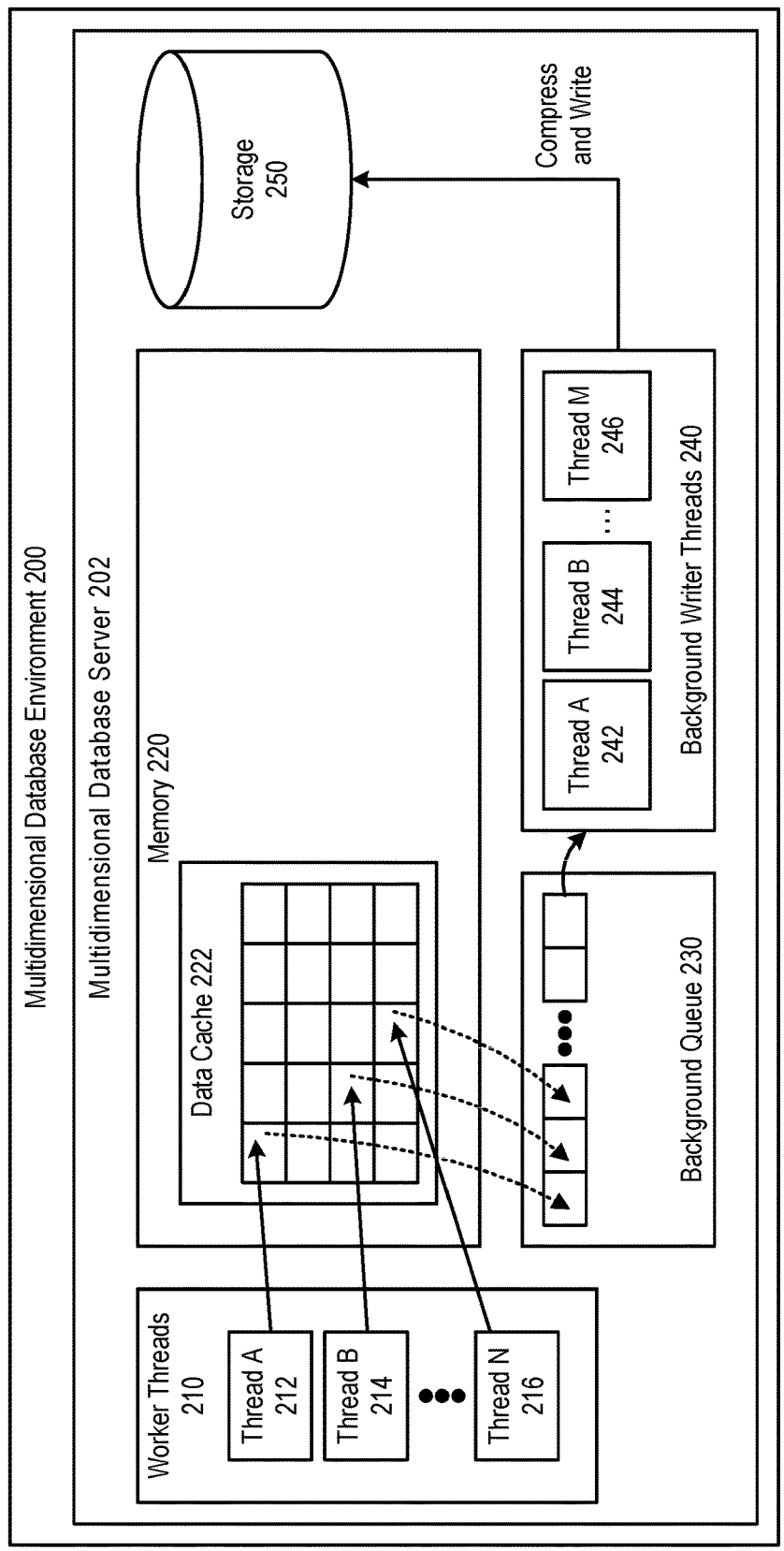
FIG. 3 further illustrates a background writing process within a multidimensional database environment in accordance with an embodiment.

FIGS. 2-3 illustrate a background writing process within a multidimensional database environment in accordance with an embodiment. In general, the background writing process involves creation of a background thread pool for each multidimensional database cube. Associated with the background thread pool is a background task queue that contains items to be performed by background threads.

For example, the background task queue contains pointers to data blocks of the data cache which are in a dirty state. During a calculation or other operation that modifies a data block in the data cache, a pointer to the data block can be added to the background task queue. A background thread, waiting on the background task queue, can access the data block and write it to data storage. After writing the data block, the background thread can check the background task queue for additional tasks.

As shown in FIG. 2, a multidimensional database environment 200 (e.g. Essbase environment) can include one or more database servers 202. The database server 202 can create and utilize a thread pool of worker threads 210. Worker threads 210 operate on data blocks of the multidimensional database cube. For example, worker threads 210 can calculate blocks (e.g., aggregate blocks or execute formulas on blocks), load data into data blocks, or otherwise modify data blocks.

Worker threads 210 operate on data blocks stored in a data cache 222 maintained in memory 220 of database server 202. Data cache 222 generally stores a small subset of data blocks contained in an entire database cube. The data blocks in data cache 222 are stored in an uncompressed state so as to be calculated, accessed, or otherwise modified. When the data cache 222 is full and calculation threads 210 need a data block not already present, a replacement operation is required. Ideally, a clean data block is chosen as a replacement victim in order to avoid costly I/O operations before calculations can continue.

When a data block in data cache 222 is modified, by calculation threads 210 for example, a pointer to the data block is added to background queue 230. A background thread pool of background writer threads 240 waits on the background queue 230 for tasks.

As shown in FIG. 2, background writer threads 240 grab data blocks identified by background queue 230 and compress and write the data blocks to storage 250. In accordance with an embodiment, the storage 250 can be a local file system or disk of database server 202 (as shown) or storage 250 can be a network file system or other remote storage.

As shown in FIG. 3, worker threads 210 can include a plurality of threads such as Thread A 212, Thread B 214, . . . and Thread N 216, where N is any integer. As worker threads touch data cache 222, data blocks are added to background queue 230.

For example, as shown, Thread A 212, Thread B 214, . . . and Thread N 216 can calculate respective data blocks of data cache 222. After completion of the respective calculations, the data blocks are added to background queue 230. When background queue 230 is a queue data structure, modified data blocks are added to a tail of the queue and, as shown in FIG. 3, background writer threads 240 select modified data blocks from the front of the queue. It is to be appreciated that other data structures (e.g. a stack) could be employed.

As shown in FIG. 3, background writer threads 240 can be a plurality of threads such as thread A 242, thread B 244, . . . and thread M 246, where M is any integer. Each thread of background writer threads 240 can individually select respective data blocks included in background queue 230 to compress and write to storage 250. Accordingly, several compression and I/O operations can occur in parallel to facilitate maintaining data cache 222 in a clean state. In an example, background queue 230 can be a lock-free queue so as to avoid having to maintain locks or other synchronization mechanisms among background writer threads 240.

In accordance with an embodiment, background writer threads 240 can operate directly on data cache 222 instead of waiting on background queue 230. For instance, background writer threads 240 can iterate over data cache 222 and compress/write any dirty blocks. When a compressed data cache is utilized, the background writer threads 240 can still perform I/O operations involving writing compressed data blocks to storage 250.

Memory Mapped I/O

In accordance with an embodiment, multidimensional database environments can benefit from improved in-memory computing by using memory mapped I/O for page files. This improves performance of data loads, calculations (both serial and parallel), exports, restructures, etc.

For example, memory-mapped I/O can be used to improve NFS (remote storage) performance, or to improve performance in general, including improving performance with remote storage. For example, kernel calls to transfer dirty data blocks from a data cache to .pag files on disk and read data blocks from .pag files into the data cache impacts performance. To avoid these I/O costs during calculations, data loads, and other operations, the multidimensional database environment can create a memory-mapping for each .pag file on disk.

The memory mapping is analogous to a copy of .pag file in memory. In order to transfer dirty data blocks to disk, the multidimensional database environment can copy the dirty data block to the memory mapped region instead of writing it directly to its .pag file on disk. The transfer from memory mapped region to disk can occur automatically in the background. This operation can be performed by an operating system, for example, since the memory mapped region may reside in the operating system file system buffer. Similarly, to read a data block, the multidimensional database environment can directly read from the memory mapped region.

The memory mapped region has direct correspondence to the .pag file on disk and is managed by the operating system. A read operation from the memory mapped region does not invoke an I/O operation if the contents being read are already cached in the memory mapped region. If not, the read operation will cause a one-time transfer of contents being read from the corresponding .pag file on disk to a corresponding memory mapped space. Future reads of the same content will likely not incur I/O costs depending on whether the contents being read have been moved out of the resident memory mapped space to the .pag file on disk according to resource management by the operating system. Since memory to memory transfer is much faster than memory to disk transfer or disk to memory, a significant improvement in calculation runtime can be achieved, as well as with data loads or other requests.

Figure 4:
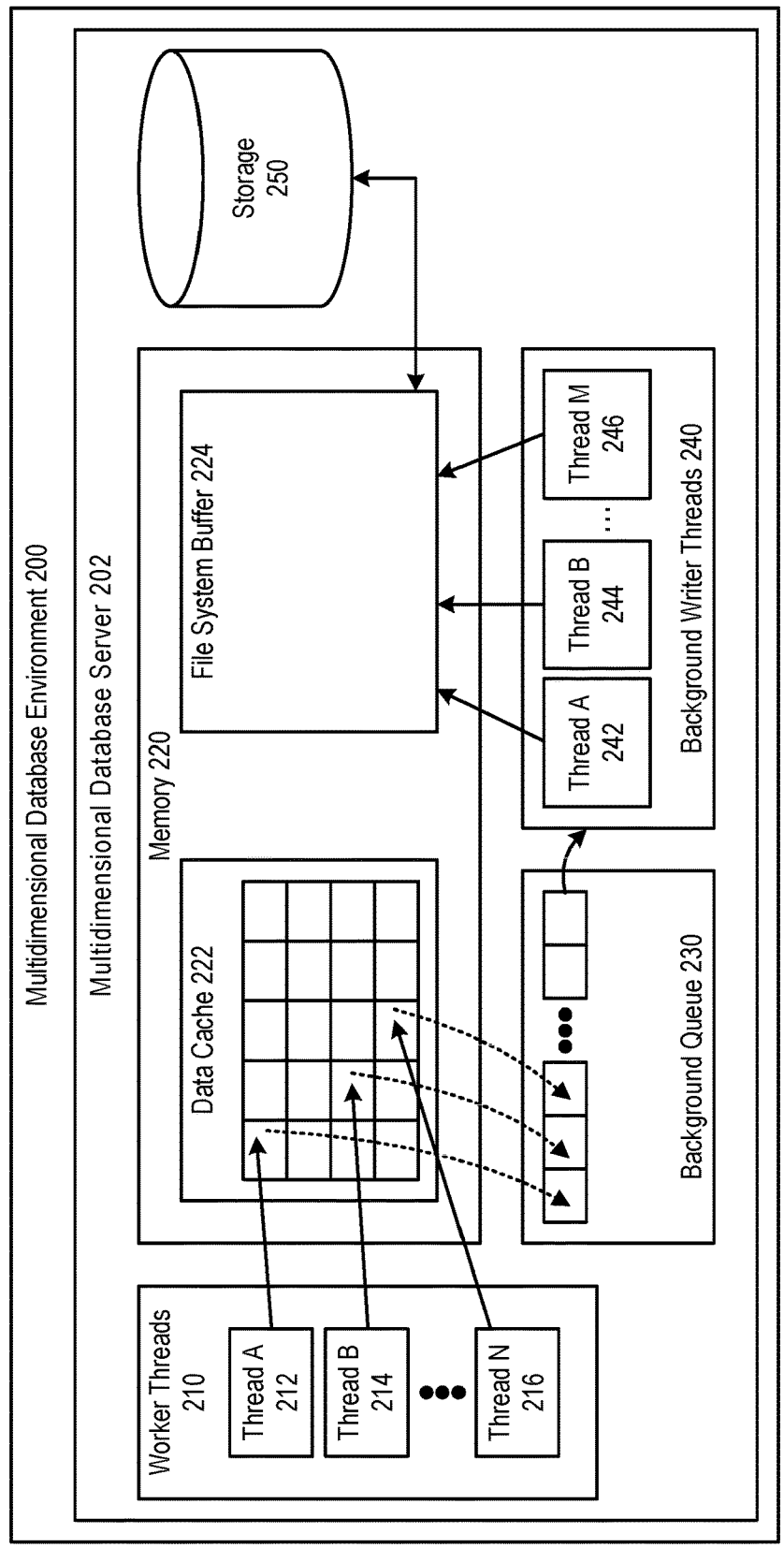
FIG. 4 further illustrates a background writing process within a multidimensional database environment in accordance with an embodiment.
Figure 5:
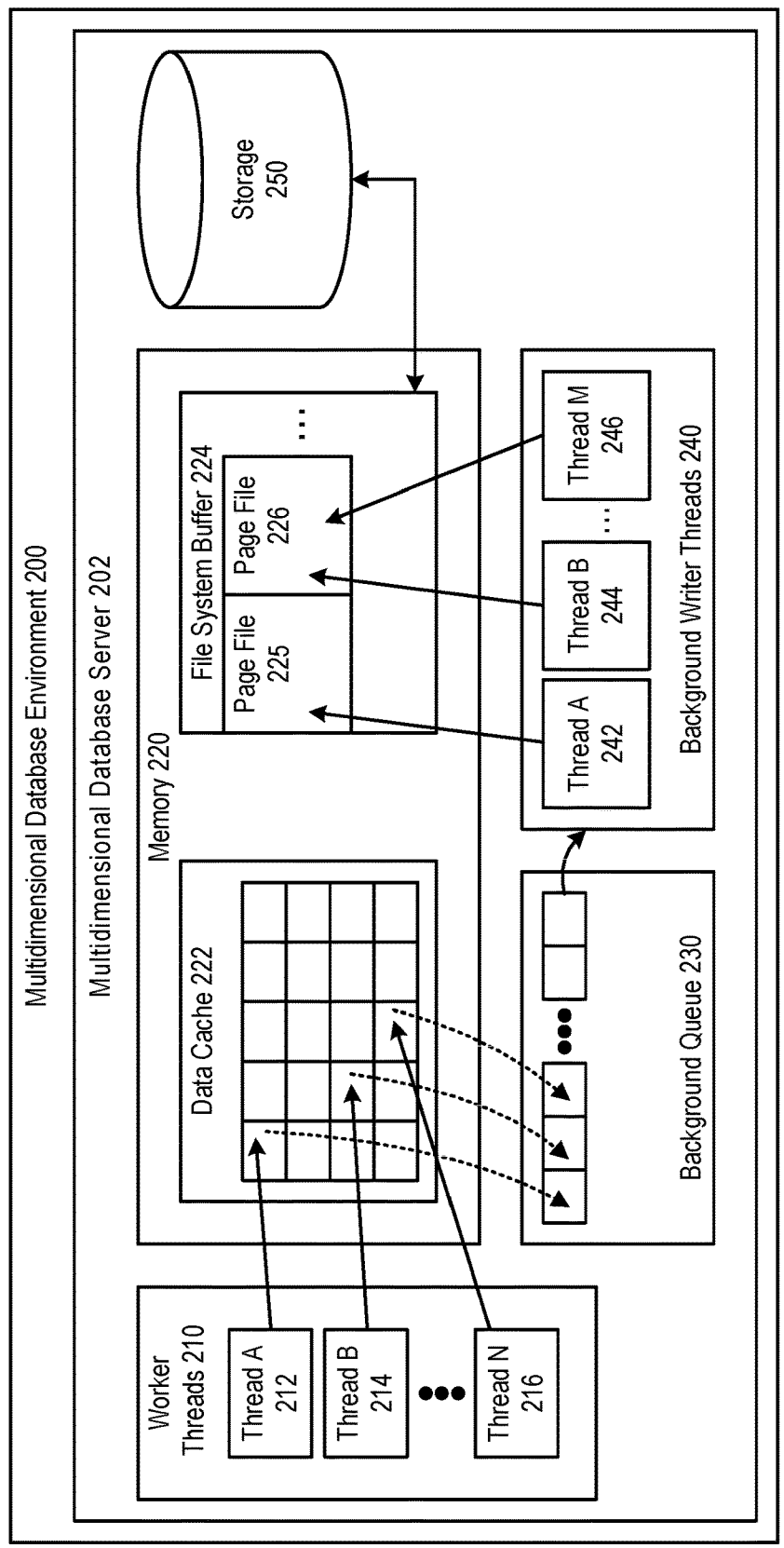
FIG. 5 further illustrates a background writing process within a multidimensional database environment in accordance with an embodiment.

FIGS. 4-5 illustrate a background writing process within a multidimensional database environment using memory-mapped I/O in accordance with an embodiment. The multidimensional database environment can memory map a .pag file every time a new .pag file is opened or created. The memory mapped pointer can be accessed like a regular pointer, and the offset into memory mapped pointer has a direct correspondence to the offset into the file on disk. In this way, data blocks can be copied to an offset into the memory mapped pointer, and the actual file is automatically synchronized at the corresponding offset by the operating system in the background.

As shown in FIG. 4, a multidimensional database environment 200 (e.g. Essbase environment) can include one or more database servers 202. The database server 202 can create and utilize a thread pool of worker threads 210. Worker threads 210 operate on data blocks of the multidimensional database cube. For example, worker threads 210 can calculate blocks (e.g., aggregate blocks or execute formulas on blocks), load data into data blocks, or otherwise modify data blocks.

Worker threads 210 operate on data blocks stored in a data cache 222 maintained in memory 220 of database server 202. Data cache 222 generally stores a small subset of data blocks contained in an entire database cube. The data blocks in data cache 222 are stored in an uncompressed state so as to be calculated, accessed, or otherwise modified. Worker threads 210 can include a plurality of threads such as Thread A 212, Thread B 214, . . . and Thread N 216, where N is any integer. As worker threads touch data cache 222, data blocks are added to background queue 230. For example, as shown, Thread A 212, Thread B 214, . . . and Thread N 216 can calculate respective data blocks of data cache 222. After completion of the respective calculations, the data blocks are added to background queue 230.

As shown in FIG. 4, background writer threads 240 can be a plurality of threads such as thread A 242, thread B 244,. . . and thread M 246, where M is any integer. Each thread of background writer threads 240 can individually select respective data blocks included in background queue 230 to compress and write. As opposed to writing the data block to storage 250, the background writer threads 240 write the data block to a file system buffer 224 of memory 220. The file system buffer 224 includes memory mappings of page files from storage 250 and is maintained by an operating system of database server 202. The operating system, in the background, writes contents of the file system buffer 224 to storage 250.

As shown in FIG. 5, the file system buffer 224 can include a plurality of page files (such as page file 225 and 226) which are mapped into memory 220 from storage 250. Page files 225 and 226 can be copies of corresponding pages files stored by storage 250. Accordingly, instead of writing to the corresponding page files on storage 250, background writer threads 240 write compressed data blocks to page files copies (e.g., page files 225, 226) stored in file system buffer 224 of memory 220.

Figure 6:
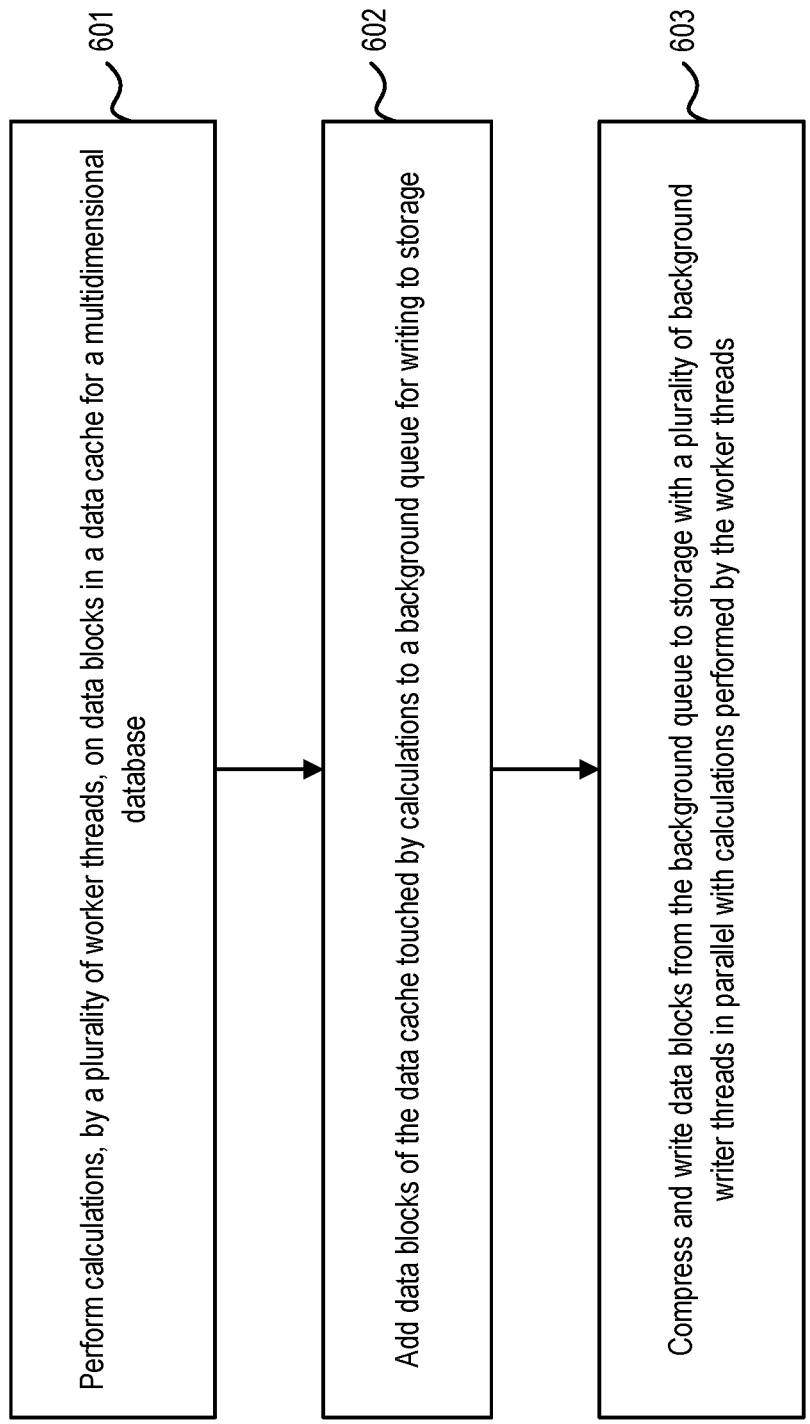
FIG. 6 illustrates a flow chart describing a background writing process for a multidimensional database environment in accordance with an embodiment.

FIG. 6 illustrates a flow chart describing a background writing process within a multidimensional database environment in accordance with an embodiment.

As illustrated in FIG. 6, at step 601, calculation are performed by a plurality of worker threads. The calculations operate on data blocks in a data cache associated with a multidimensional database.

At step 602, data blocks of the data cache touched by calculations are added to a background queue for writing to storage. Storage can be a disk or a file system buffer having memory-mapped contents maintained by an operating system.

At step 603, a plurality of background writer threads, operating in parallel with the worker threads, compress and write data blocks form the background queue to storage.

Data Cache Replacement Policy

In accordance with an embodiment, a data block replacement policy is invoked when a data cache is full. When full and a data block is needed from storage, an existing data block in the data cache need to be swapped out. Ideally, a replacement policy would result in selection of a replacement victim that is clean and which is unlikely to be referenced by a calculation in the near future.

In some systems, a replacement policy may choose a first swappable data block as a replacement victim based on a sequential search on the data cache. The first swappable data block is a data block that is not active (i.e. not being used by any worker thread). This policy does not consider whether the data block is in a clean state or a dirty state. For example, if the first swappable data block is a clean block, it is not necessary to write it out to disk before replacing it with another data block from disk. If the first swappable data block is in a dirty state, the data block needs to be written to disk before replacement.

To increase likelihood of avoiding I/O costs, a data cache replacement policy should increase a probability of selecting a clean data block, as the replacement victim, rather than a dirty data block. According to aspects described herein, the data cache replacement policy can leverage background writing. For instance, the data cache replacement policy can account for the fact that background writing proactively cleans dirty data blocks.

In accordance with an embodiment, a data cache replacement policy, that leverages background writing infrastructure, can involve first scanning the entire data cache once to identify a first clean data block. Next, the policy instructs the first clean data block is to be analyzed to determine whether or not the block is swappable. If the data block is swappable, it can be replaced without incurring any additional costs associated with writing. If the data block is not swappable, a conventional policy is utilized. That is, a search is performed on the data cache for a first swappable data block, whether clean or dirty.

In accordance with another embodiment, the data cache policy can involve usage of a lock-free queue (or stack) that tracks recently cleaned blocks. The background writing threads can add pointers of each data block cleaned to this queue. To replace a data block, the queue is scanned for a first clean data block that is also swappable. This clean, swappable data block can be replaced with a new data block without incurring costs associated with writing out the replacement victim.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for performing input/output operations on data blocks with a multidimensional database, comprising:
 a multidimensional database for storage of data; and
 a computing device having a processor that executes instructions to:
  create a background thread pool for the multidimensional database, the background thread pool being associated with a background queue that indicates data blocks in a data cache stored in memory which have a dirty state;
  execute, by a first calculation thread in a calculation thread pool, a first calculation on a first data block in the data cache;
  add the first data block to the background queue; and
  write the first data block from the background queue to a data storage via a writer thread of the background thread pool.

2. The system of claim 1, wherein the processor is further configured to execute, by a second calculation thread in the calculation thread pool, a second calculation on a second data block in the data cache, wherein the second calculation is executed in parallel with the writing of the first data block from the background queue to the data storage.

3. The system of claim 1 wherein adding the first data block to the background queue includes adding a pointer to the background queue, and wherein the pointer points to the first data block in the data cache.

4. The system of claim 1, wherein when writing the first data block from the background queue the writer thread compresses the first data block.

5. The system of claim 4, wherein the data storage is a memory-mapped data file stored in memory, and
 wherein the processor is further configured, by an operating system, to persist the memory-mapped data file in memory to a disk.

6. The system of claim 1, wherein the processor is further configured to swap data blocks in the data cache, wherein to effect a swap the processor is configured to:
 scan the data cache for a clean data block having a clean state;
 determine whether the clean data block is swappable; and
 replace the clean data block in the data cache with a new data block from data storage when the clean data block is swappable.

7. The system of claim 1, wherein the processor is further configured to;
 maintain a lock-free queue to track data blocks written to data storage within a predetermined time period;
 identify a clean data block from the queue, which maintains a clean state and is swappable, as a replacement victim; and
 swap the clean data block identified in the data cache with a new data block from the data storage.

8. A method for performing input/output operations on data blocks of a multidimensional database, comprising:
 creating a background thread pool for the multidimensional database, the background thread pool being associated with a background queue that indicates data blocks in a data cache stored in memory which have a dirty state;
 executing, by a first calculation thread in a calculation thread pool, a first calculation on a first data block in the data cache;
 adding the first data block to the background queue; and
 writing the first data block from the background queue to a data storage via a writer thread of the background thread pool.

9. The method of claim 8, further comprising executing, by a second calculation thread in the calculation thread pool, a second calculation on a second data block in the data cache, wherein the second calculation is executed in parallel with the writing of the first data block from the background queue to the data storage.

10. The method of claim 8, wherein adding the first data block to the background queue includes adding a pointer to the background queue, and wherein the pointer points to the first data block in the data cache.

11. The method of claim 8, further comprising:
 compressing the first data block by the writer thread.

12. The method of claim 8, wherein the data storage is a memory-mapped data file stored in memory, and
 wherein the method further comprises persisting the memory-mapped data file in memory to a disk by an operating system.

13. The method of claim 8, further comprising swapping data blocks in the data cache with data blocks from data storage, wherein swapping comprises:
 scanning the data cache for a clean data block having a clean state;
 determining whether the clean data block is swappable; and
 replacing the clean data block in the data cache with a new data block from data storage when the clean data block is swappable.

14. The method of claim 8, further comprising;
 tracking, with a lock-free queue, data blocks written to data storage within a predetermined time period;
 identifying a clean data block from the lock-free queue, which has a clean state and is swappable, as a replacement victim; and
 swapping the clean data block identified in the data cache with a new data block from the data storage.

15. A non-transitory computer-readable storage medium having instructions stored thereon, which when read and executed by a computer, cause the computer to:
 create a background thread pool for a multidimensional database, the background thread pool being associated with a background queue that indicates data blocks in a data cache stored in memory which have a dirty state;
 execute, by a first calculation thread in a calculation thread pool, a first calculation on a first data block in the data cache;
 add the first data block to the background queue; and
 write the first data block from the background queue to a data storage via a writer thread of the background thread pool.

16. The non-transitory computer-readable medium of claim 15, wherein the instructions further configure the computer to execute, by a second calculation thread in the calculation thread pool, a second calculation on a second data block in the data cache, wherein the second calculation is executed in parallel with the writing of the first data block from the background queue to the data storage.

17. The non-transitory computer-readable medium of claim 15, wherein adding the first data block to the background queue includes adding a pointer to the background queue, and wherein the pointer points to the first data block in the data cache.

18. The non-transitory computer-readable medium of claim 15, wherein when writing the first data block from the background queue the writer thread compresses the first data block.

19. The non-transitory computer-readable medium of claim 18, wherein the instructions further cause the writer thread to write the first data block to a memory-mapped data file stored in memory,
- wherein the memory-mapped data file stored in memory is automatically persisted to a disk by an operating system.

20. The non-transitory computer-readable medium of claim 18, wherein the instructions further cause the computer to swap data blocks in the data cache, wherein to effect a swap the instructions cause the computer to:
- scan the data cache for a clean data block having a clean state;
- determine whether the clean data block is swappable; and
- replace the clean data block in the data cache with a new data block from data storage when the clean data block is swappable.

\* \* \* \* \*

UNITED STATES PATENT AND TRADEMARK OFFICE
CERTIFICATE OF CORRECTION

PATENT NO. : 10,346,435 B2
APPLICATION NO. : 15/332945
DATED : July 9, 2019
INVENTOR(S) : Walker et al.

Page 1 of 1

It is certified that error appears in the above-identified patent and that said Letters Patent is hereby corrected as shown below:

In the Claims

In Column 11, Line 26, in Claim 3, after "claim 1" insert -- , --.

Signed and Sealed this
Twenty-eighth Day of July, 2020

Andrei Iancu
*Director of the United States Patent and Trademark Office*